March 29, 1932.  F. S. NORTHUP  1,851,371
ANIMAL TRAP
Filed Oct. 2, 1928  2 Sheets-Sheet 1
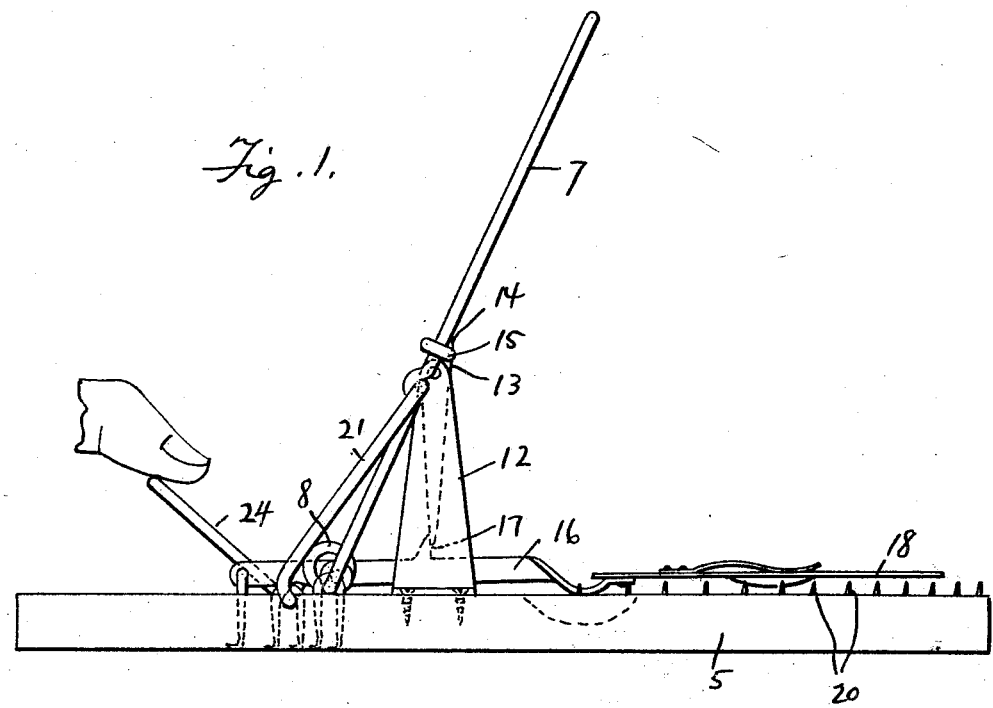
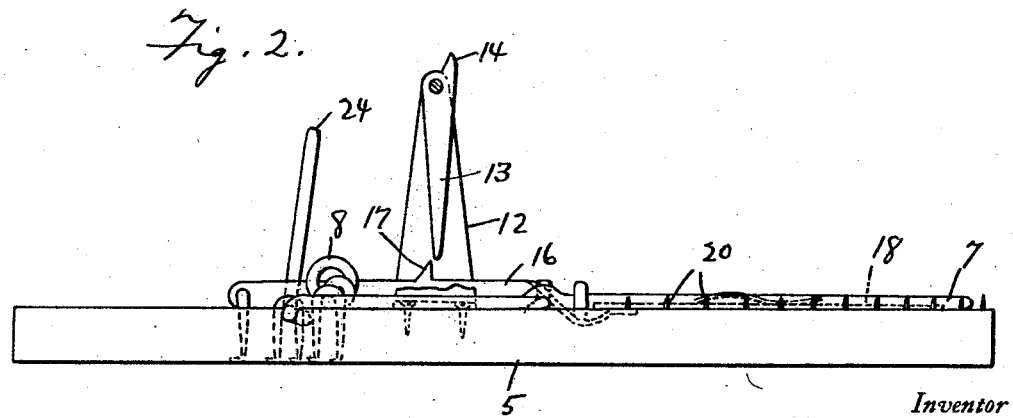
Inventor
Franz S. Northup
By Clarence A. O'Brien
Attorney March 29, 1932.  F. S. NORTHUP  1,851,371
ANIMAL TRAP
Filed Oct. 2, 1928   2 Sheets-Sheet 2

Inventor
Franz S. Northup

By Clarence A. O'Brien
Attorney

Patented Mar. 29, 1932

1,851,371

UNITED STATES PATENT OFFICE

FRANZ S. NORTHUP, OF OAKLAND, CALIFORNIA

ANIMAL TRAP

Application filed October 2, 1928. Serial No. 309,776.

This invention relates to new and useful improvements in animal traps of the single spring jaw variety, and aims to provide a highly novel, simple and efficiently operating trap that may be easily set without danger to the operator and that is equipped with a jaw latch mechanism for maintaining the jaw in open position, highly sensitive animal control means being provided for releasing the mechanism when the animal walks thereon enticed by bait that is attached to the means.

One of the most important objects of this invention is to provide a trap of this character that may be manufactured and marketed at low cost, and that is so constructed as to prevent the animals from sliding or wiggling from under the jaw after they have been caught thereby.

With the foregoing and other objects in view as the nature of the invention will be better understood, the same comprises the novel form, combination and arrangement of parts hereinafter more fully described, shown in the accompanying drawings and claimed.

In the accompanying drawings wherein like reference characters indicate corresponding parts:

Figure 1 is a side elevation of my improved trap in set position.

Figure 2 is a side elevation, certain parts being broken away, and disclosing the jaw in sprung position.

Figure 3:
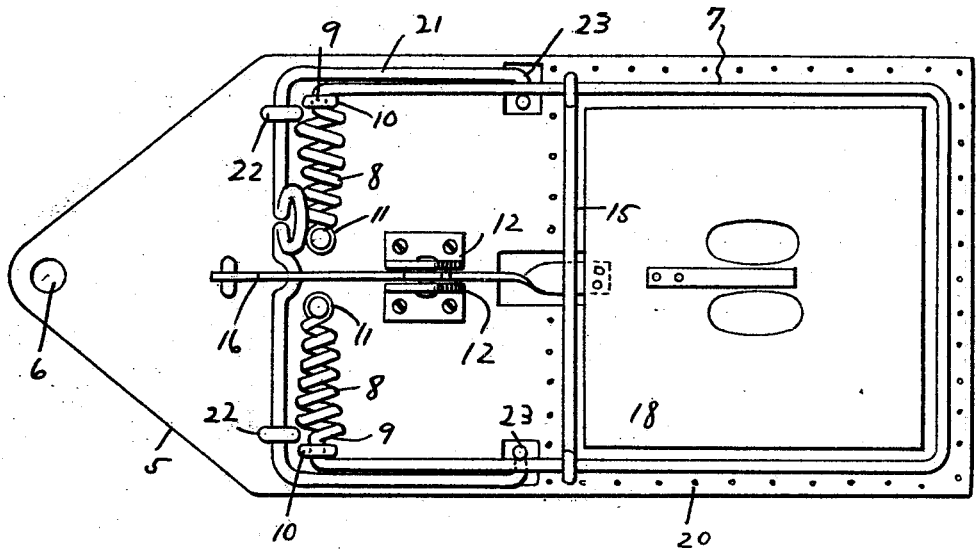
Figure 3 is a top plan view of the trap, the jaw being sprung.
Figure 4:
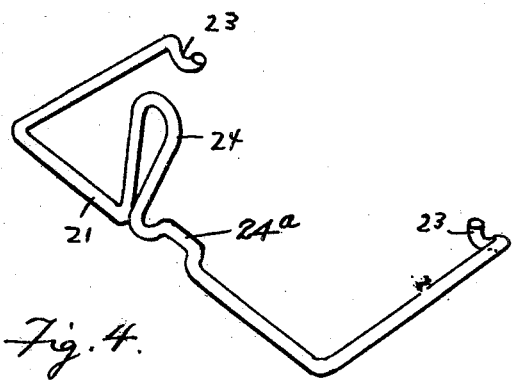
Figure 4 is a perspective of the unit associated with the jaw to facilitate the setting of the same without danger to the operator.

Now having particular reference to the drawings, my novel trap consists of a suitable base 5 of wood, metal, or other material provided adjacent one end with an opening 6 whereby the same may be anchored to the ground or floor, if desired. The trap further consists of a relatively elongated spring steel wire jaw 7, the free ends of the side legs of which are formed with inwardly extending coil springs 8—8, the wire at the points of juncture between these springs and the side legs of the jaw being uncoiled to provide pintles 9—9 that are loosely pivoted through eye screws or staples 10—10 driven into the base 5, as clearly disclosed in Figure 1. The inner ends of said springs 8—8 are anchored to the base as at 11—11. The winding of these springs is such as to cause the jaw 7 to lie horizontally upon the base 5 as disclosed in Figures 2 and 3, the raising of the jaw to the position disclosed in Figure 1 causes the further winding of the springs, and consequently great tension therein.

Arranged upon the base 5 intermediate the side edges thereof and slightly forwardly of the anchored ends of said springs 8—8 is a pair of vertically extending spaced brackets 12—12 between the upper ends of which is loosely pivoted an elongated latch arm 13 formed at its upper end with a latch point or lug 14 adapted for engagement in front of a cross bar 15 secured at its opposite ends to the side legs of the jaw when said jaw is in the raised position as indicated in Figure 1.

Pivoted to the base 5 intermediate the side edges thereof in back of the springs 8—8 is a longitudinally extending arm 16 formed at a point between the vertical brackets 12—12 with an upwardly extending latch point or lug 17 for engagement in back of the lower end of the latch arm 13 when the upper end of the same is engaged with the cross bar 15 of the strap jaw 7.

The forward end of the arm 16 is twisted upon itself to provide a horizontal end to which is secured an animal treadle 18 in the form of a relatively square shaped plate of some suitable but light material, the weight of which when combined with the weight of the arm 16 will not be sufficient to cause the dropping of the arm when the latch arm 13 is pressed against the point or lug 17 by the tendency of the jaw 7 to swing downwardly. However, the weight of an animal stepping upon the treadle 18 will be sufficient to force the treadle and arm 16 downwardly for releasing the latch 13 whereupon the jaw 7 will immediately spring to closed position for catching the animal between the jaw and the trap base 5.

In order to prevent the animals from wriggling from under the jaw 7 the base 5 of the trap is provided around the edge of the treadle 18 with vertically upstanding pins 20. As disclosed in Figures 1 and 3, the top face of the treadle 18 may be and preferably is equipped with suitable means for having attached thereto any desirable character of bait.

In order to facilitate the setting of the jaw 7 there is provided a relatively U-shaped spring wire lever 21 the intermediate portion of which is pivoted adjacent its opposite ends to the base 5 as at 22—22 directly in back of the springs 8—8, the side legs of this lever extending forwardly with respect to the base and are formed at their ends with inwardly directed curved fingers 23—23 for engagement beneath the side legs of the jaws 7—7.

The intermediate portion of the lever 21 is so bent at one side of its center to provide a substantially right angular and upwardly projecting arm 24 whereby the said lever may be swung from the horizontal position indicated in Figure 3 to the position disclosed in Figure 1 by pulling rearwardly upon said arm 24 whereby the said jaw 7 is raised as disclosed in Figure 1 and caught by the latch mechanism. The bight portion of the lever or member 21 is bent to provide a small projection 24a, this projection extending under the lever 16 for raising the same to latching position when the member 21 is rocked.

In view of the foregoing description when considered in conjunction with the accompanying drawings it will be apparent that I have provided a highly novel, simple, and extremely useful animal trap that is well adapted for all the purposes heretofore designated, even though I have herein shown and described the invention as consisting of certain detail structural elements it is nevertheless to be understood that some changes may be made therein without affecting the spirit and scope of the appended claims.

Having thus described the invention, what I claim as new is:—

1. A trap of the class described, comprising a base, a U-shaped jaw member pivoted to the base, spring means for holding the jaw member in closed position adjacent the base, a cross bar having its ends connected with intermediate portions of the limbs of the jaw member, an upstanding bracket on the base, a lever pivoted to the bracket and having a projection on its upper end for engaging the cross bar to hold the jaw member in raised position, a lever pivoted to the base and extending over that part of the base adjacent which the jaw member rests when the jaw member is in lowered position and a projection on said lever to engage the lower end of the lever pivoted to the bracket for holding the parts with the jaw member in raised position.

2. Means for setting the jaw member of a trap comprising a setting lever for the jaw member including a U-shaped member having its bight pivoted to the base with projections on the ends of its limbs extending under the limbs of the jaw member and a handle part on the bight for rocking the lever to raise the jaw member.

3. Means for setting the jaw member of a trap and for moving the latch lever of the trap to latching position comprising a setting member consisting of a U-shaped member having its bight pivoted to the base and projections at the ends of its limbs extending under the limbs of the jaw member, a handle part on the bight for rocking the member to cause the projections to raise the jaw member and a second projection on the bight extending under the lever for raising the same to latching position.

In testimony whereof I affix my signature.

FRANZ S. NORTHUP.